(12) United States Patent
Bowen et al.

(10) Patent No.: US 8,999,274 B2
(45) Date of Patent: Apr. 7, 2015

(54) TREATMENT OF SULPHIDIC MATERIALS

(75) Inventors: Patrick Bowen, Brisbane (AU); Michael Matthew Hourn, Brisbane (AU)

(73) Assignee: Glencore Queensland Limited, Brisbane (AU)

( * ) Notice: Subject to any disclaimer, the term of this patent is extended or adjusted under 35 U.S.C. 154(b) by 0 days.

(21) Appl. No.: 14/237,831

(22) PCT Filed: Aug. 8, 2012

(86) PCT No.: PCT/AU2012/000937
§ 371 (c)(1),
(2), (4) Date: May 23, 2014

(87) PCT Pub. No.: WO2013/020175
PCT Pub. Date: Feb. 14, 2013

(65) Prior Publication Data
US 2014/0322108 A1    Oct. 30, 2014

(30) Foreign Application Priority Data

Aug. 8, 2011    (AU) ................... 2011903163

(51) Int. Cl.
*C22B 13/08* (2006.01)
*C22B 19/02* (2006.01)
*C22B 3/04* (2006.01)
*C22B 3/08* (2006.01)
*C22B 3/00* (2006.01)

(52) U.S. Cl.
CPC . *C22B 19/02* (2013.01); *C22B 3/04* (2013.01); *C22B 3/08* (2013.01); *C22B 13/04* (2013.01)

(58) Field of Classification Search
None
See application file for complete search history.

(56) References Cited

U.S. PATENT DOCUMENTS

| 3,954,450 | A | 5/1976 | Kuhn et al. |
| 4,063,933 | A | 12/1977 | Peters |
| 4,545,963 | A | 10/1985 | Weir et al. |
| 4,568,525 | A | 2/1986 | Beutier |

FOREIGN PATENT DOCUMENTS

| AU | 555840 | 11/1982 |
| WO | WO 96/07762 A1 | 3/1996 |
| WO | WO96/15279 A1 | 5/1996 |

OTHER PUBLICATIONS

International Search Report and Written Opinion, PCT/AU2012/000937, mailed Sep. 26, 2012.

*Primary Examiner* — Melissa Swain
(74) *Attorney, Agent, or Firm* — Winston & Strawn LLP

(57) ABSTRACT

A process for treating a mixed sulphidic material containing lead sulphide and at least one other metal sulphide. The process includes the steps of subjecting the mixed sulphidic material to selective oxidation such that lead sulphide in the material is oxidised to form an oxidized lead compound while substantial oxidation of the at least one other metal sulphide is avoided, and separating the oxidized lead compound from the at least one other metal sulphide. The oxidized lead compound may be separated by flotation wherein the oxidized lead compound reports to the tailings and the at least one other metal sulphide reports to the concentrate (froth).

22 Claims, 2 Drawing Sheets

TREATMENT OF SULPHIDIC MATERIALS

This application is a 371 filing of International Patent Application PCT/AU2012/000937 filed Aug. 8, 2012, which claims priority to Australian application no. 2011/903163 filed Aug. 8, 2011.

FIELD OF THE INVENTION

The present invention relates to a process for the treatment of sulphidic materials. The present invention is especially suitable for treating mixed sulphide ores or concentrates.

BACKGROUND TO THE INVENTION

Lead and zinc are often found as a mixed sulphidic ore. Sulphidic ore bodies containing lead and zinc may also contain sulphides of copper and iron, as well as gold and silver. Recovery of lead and zinc from such mixed sulphide ores has been achieved by a number of different processes. For example, the ore may be treated to form a concentrate of enhanced lead and zinc content and concentrate may be subjected to other metallurgical processes, such as smelting, to recover lead and zinc metal.

Alternatively, treatment of such ores typically involves a number of flotation steps to recover a high-grade lead concentrate and high-grade zinc concentrate. The high-grade lead concentrate is then treated to recover lead and the high-grade zinc concentrate is then treated to recover zinc.

Hydrometallurgical processes have also been used in which the ore or concentrate is leached with sulphuric acid whereby the zinc sulphide is dissolved (in the form of zinc sulphate) in a leaching solution, with zinc being recovered using an electrowinning process.

Several processes for treating mixed sulphidic materials are set out below:

U.S. Pat. No. 3,954,450 discloses contacting lead sulphide material with an aqueous medium containing aqueous sulphate and free ammonia. The slurry is introduced into a reaction vessel and oxygen is introduced to the vessel. The sulphide is converted into substantially water insoluble oxidic lead compounds whilst any zinc present is dissolved. The zinc-containing solution is separated from the solids residue and the solution is treated to recover zinc metal. The residue is subject to froth flotation and lead reports to the tailings. The lead-containing tailings are treated to recover lead metal. The concentrate from the froth flotation step contains iron sulphide and may be discarded or sent to treatment to recover iron.

U.S. Pat. No. 4,063,933 describes a process for treating a sulphide concentrate containing lead, copper, zinc and silver to selectively recover these metals. The process comprises contacting the concentrate with sulphuric acid in the presence of oxygen at elevated pressure and temperature to extract copper and zinc from the concentrate (by dissolution as soluble sulphates), followed by recovery of copper and zinc from the solution. The leach residue (which contains lead) is contacted with lime to remove sulphur. Subsequently, the leach residue is contacted with a mixture of calcium chloride and ferric chloride to extract lead and silver.

U.S. Pat. No. 4,545,963 describes the separate recovery of zinc and lead values from zinc and lead containing sulphide ores that also contain iron. The process comprises grinding the ore, subjecting the ground ore to a first flotation step to float an initial lead concentrate containing zinc and to produce a zinc and iron containing tailings. The zinc and iron containing tailings is subjected to a second flotation step to float an initial zinc concentrate and produce a tailings. The initial zinc concentrate is then subjected to a third flotation step to float a further zinc concentrate containing iron and also produce a zinc and iron containing tailings. The tailings from the third flotation step and at least the lead and zinc containing portion of the initial lead concentrate is leached under oxidising conditions at a temperature of from 130 to 170° C. in aqueous sulphuric acid to produce a lead containing residue and a first leach solution containing zinc and iron. The acid leaching step results in the dissolution of zinc, which can be subsequently recovered using electrowinning.

U.S. Pat. No. 4,568,525 describes a method of producing a zinc sulphide containing concentrate from a mixed lead-zinc concentrate. This process involves selective leaching of lead using a ferrous chloride solution with an oxygen containing gas being bubbled through the leaching solution. The lead sulphide is converted to lead chloride, which either dissolves into solution or forms lead chloride precipitate, which can then be separated from the zinc sulphide by any physical technique such as flotation. The selectivity of conversion of lead sulphide to lead chloride is enhanced by conducting the leaching step using a relatively coarse granulometry of the feed material, with a particle size distribution of the feed material having a $d_{80}$ of greater than about 200 μm being preferred.

International patent publication number WO 96/07762 describes leaching of mixed concentrates in an autoclave by oxidising sulphur components in the feed to produce sulphuric acid in-situ. The slurry resulting from the leach is neutralised and metals are removed by known processes after the slurry has been subjected to a solid/liquid separation step. The conditions used in the autoclave include temperatures of at least 180° C. and pressures in the range of 2 to 8 atm.

International patent publication number WO 96/15279 describes the mechanical activation of sulphide minerals to induce chemical reactions between sulphide minerals and certain reactants at low temperatures which cause the chemical breakdown of sulphide grains. The main focus of the specific embodiments of this patent relate to the treatment of ZnS containing powders. Copper oxide is mixed with the ZnS to form zinc sulphate according to the following reaction:

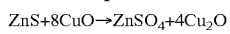

$$ZnS+8CuO \rightarrow ZnSO_4+4Cu_2O$$

The soluble zinc sulphate is separated from the insoluble copper oxide by leaching with water.

Mixed sulphide ores are also treated by the "Albion Process". The Albion process was developed by MIM Holdings (now Xstrata Plc) and is being commercialised by Xstrata Technology. The process involves an ultrafine grinding of a mineral or concentrate, followed by oxidative leaching at atmospheric pressure in conventional agitated tanks.

Zinc concentrates may be treated in the Albion process to produce a leach solution containing dissolved zinc and a leach residue solids containing other oxidised material. Zinc can be recovered from the leaching solution using electrowinning.

The Albion process has also been used to recover gold, copper and silver.

Throughout this specification, the term "comprising" and its grammatical equivalents shall be taken to have an inclusive meaning unless the context of use indicates otherwise.

The present applicant does not concede that the prior discussed in this specification forms part of the comment of knowledge in Australia or elsewhere.

SUMMARY OF THE INVENTION

In a first aspect, the present invention provides a process for treating a mixed sulphidic material containing lead sulphide and at least one other metal sulphide, the process comprising the steps of subjecting the mixed sulphidic material to selective oxidation such that lead sulphide in the material is oxidised to form an oxidised lead compound whilst substantial oxidation of the at least one other metal sulphide is avoided, and separating the oxidized lead compound from the at least one other metal sulphide.

In one embodiment, the oxidised lead compound is separated from the at least one other metal sulphide by use of a flotation step. In the flotation step, the oxidised lead compound reports to a tailings stream and the at least one other metal sulphide is recovered to a concentrate. The tailings stream may then be subjected to further treatment to recover lead therefrom.

The material that can form the feed material to the process of the present invention may comprise a sulphide ore or a sulphide concentrate. The sulphide material contains lead sulphide and at least one other metal sulphide, such as zinc sulphide and/or iron sulphide. Other metal sulphides, such as copper sulphide, may also be present.

The feed material provided to the process of the present invention may comprise an ore or a concentrate. If the feed material comprises a concentrate, that concentrate may have been prepared by subjecting a sulphide ore to a flotation treatment to reduce the gangue content and to increase the sulphide concentrations.

The feed material that is provided will normally comprise particulate material. Typically, the feed material has a particle size distribution that is set by the processing requirements of any processes that occur upstream of the present invention, such as any flotation steps that may be conducted to form a concentrate to feed to the process of the present invention.

The feed material may be subject to grinding prior to the selective oxidation step. In one embodiment, the feed material is subjected to an ultrafine grinding process. In one embodiment, the material in step (a) is subjected to grinding such that the ground material has a $d_{80}$ of less than 20 μm, more preferably less than 15 μm, even more preferably less than 10 μm, most preferably less than 7 μm.

In other embodiments, the feed material may be subjected to grinding to produce a coarser grind size than those provided above.

The person skilled in the art will recognise that the grinding of the feed material and the particle size distribution of the feed material will depend somewhat on achieving adequate mineral liberation to enable selective oxidation and selective separation to occur, as well as the desired end use of the product of the process of the present invention. For example, if a downstream plant requires a lead-containing stream to have a certain particle size distribution, the feed material is desirably subjected to grinding to achieve the desired down stream particle size in the lead-containing product stream. In some instances, this may involve a trade-off between yield/recovery of lead from the feed material and improved economics for the downstream processing. Operating cost considerations are also likely to have an impact on the grinding of the feed material (for example, by balancing improved yield against increased grinding costs). Typically, a finer particle size will result in a higher lead conversion to oxidised form but other considerations (as discussed above) may result in a coarser particle size for the feed material being used. It is also possible that recovering some of the lead in a sulphide form will increase the lead content of the product. Thus, if the lead-containing product of the present invention is to be sold as a product in its own right, it may be desirable to limit the amount of oxidation of the lead to that which is capable of causing separation of the lead-containing material (which will include lead sulphide and oxidised lead compounds) from the other metal sulphides present.

The grinding step may be carried out using any known grinding equipment. One suitable type of grinding equipment for use in the grinding step is a horizontal stirred mill, such as the grinding mill available from Xstrata Technology and sold under the trademark IsaMill™. The IsaMill™ is especially suitable for use in the present invention because it enables fine grinding to be achieved in an economical manner. However, the person skilled in the art will understand that other grinding equipment or grinding mills may also be used in the present invention.

The sulphidic material will typically be subjected to grinding in the form of an aqueous slurry. The sulphidic material may be simply mixed with water to form the slurry in the grinding step. Alternatively, the sulphidic material may be dry ground and then put into a slurry form.

The ground material leaving the grinding mill (which may be in the form of a slurry or pulp) is subsequently subjected to an oxidation process. If the feed material does not require grinding, the feed material will be subjected to an oxidation process. The oxidation process is operated such that lead sulphide is oxidised to form an oxidised lead compound whilst substantial oxidation of other metal sulphides is limited or avoided. It will be appreciated that oxidation of some of the at least one other metal sulphide may occur, but it is desired to keep oxidation of the at least one other metal oxide to a minimum. The oxidised lead compound may comprise lead sulphate or lead oxide or indeed any lead compound or compounds that results from oxidation of lead sulphide.

In one embodiment, at least 50% of the lead sulphide present in the sulphidic material is oxidised in the selective oxidation step. Suitably, from 75 to 100% of the lead sulphide present in the material is oxidised, more suitably from 75 to 90% or even 75 to 80% of the lead sulphide present in the material is oxidised.

Oxidation of the lead sulphide may be achieved by passing an oxygen containing gas, such as air, through the slurry or pulp of the mixed sulphidic material. Conventional mixing equipment may be used to achieve mixing of the oxygen containing gas with the pulp or slurry. For example, the mixing equipment used in the Albion process (as discussed above) may be used. The mixing equipment may comprise a stirred tank having aerators or spargers located in the bottom of the tank. The tank may be stirred by use of one, or more impellers, stirrers or paddles.

The oxidation step may take place in an open tank. The oxidation step may take place at atmospheric pressure.

In a preferred embodiment, air is added to the pulp or slurry of the mixed suphidic material in order to selectively oxidise the lead sulphide.

In some embodiments, an excess of air or oxygen containing gas is added (calculated on the oxygen required to oxidise lead sulphide). In some embodiments, an oxygen excess based upon stoichiometry is used, based upon the amount of oxygen required for the stoichiometric oxidation of lead sulphide.

In some embodiments, selective oxidation of the lead sulphide may be achieved by simply mixing the pulp or slurry with air (or other oxygen containing gas). In some embodiments, selective oxidation of the lead sulphide may be achieved by simply mixing the pulp or slurry with air or other oxygen containing gas and also be enhanced by the combination with other oxidants, such as ferric ions.

In other embodiments, the oxidation step is carried out under acidic conditions. For example, sulphuric acid may be added to the slurry or pulp, in addition to the air or other oxygen containing gas. Without wishing to be limited by theory, the present inventors believe that conducting the oxidation step under acidic conditions increases the rate of the oxidation reaction that converts lead sulphide to lead sulphate.

In these embodiments, the pH in the selective oxidation step may be controlled to fall within the range of 0 to 4.

Sulphuric acid is the preferred acid for use if the oxidation step is to be operated under acidic conditions, as this assists in forming lead sulphate during the oxidation process. The amount of sulphuric acid required to be added in this embodiment of the oxidation stage will depend upon the amount of lead sulphide present in the mineral material and the amount of other acid consuming species present in the mineral material. The present inventors believe that an amount of sulphuric acid equivalent to 60% to 300% of the sulphuric acid required to convert the lead sulphides to lead sulphate is likely to be added to the oxidation step.

As mentioned above, the oxidation step may target the oxidation of from 50% to 100% of the lead sulphide present in the material. This acts to minimise the amount of lead that reports to the concentrate in the subsequent flotation step. This also minimises the amount of oxidation of other sulphides. If oxidation of other sulphides occurs they may report to the tailings in the subsequent flotation step and dilute the lead content of the tailings, or they may report to solution, which will require additional solution processing for recovery.

As mentioned above, the oxidation step is suitably conducted by mixing air with a pulp or slurry in a mixing tank. The pulp or slurry in the mixing tank may have a solids ratio of from 5 to 80% by weight. In one embodiment of the present invention, a fairly conventional solids ratio of 20 to 25% by weight solids in the pulp or slurry may be used. In other embodiments of the present invention, a higher solids ratio of 50 to 65% by weight may be used.

In one embodiment of the present invention, the oxidation step is preferably operated by also injecting and mixing air into the pulp or slurry of mineral material. The amount of air that may be injected will typically be in excess of the amount of air required to effect the oxidation of galena (based upon stoichiometric requirements). Without wishing to be bound by theory, the present inventors believe that air may be desirable for use in the oxidation step of the present invention rather than pure oxygen because using air may result in less efficient oxidation when compared to using pure oxygen, and this could retard oxidation of other sulphide species in the mineral material. For the same reason, it may also be desirable to use a relatively high solids ratio of from about 50% to 65% by weight in the pulp or slurry present in the oxidation step.

The temperature of the selective oxidation step may have an influence on the kinetics but is not believed to be especially critical. Indeed, it may not be necessary to provide any external heating to the selective oxidation step, save for the heating input caused by stirring the pulp or slurry or from the upstream process(es). In this regard, the selective oxidation step may be conducted autothermally. Temperature may be controlled by the rate of addition of sulphuric acid, oxygen (and/or other oxidising agents) and by the pulp or slurry density. Furthermore, if the process is being operated in a hot weather climate, it may be necessary to cool the pulp or slurry in the selective oxidation step in order to minimise or avoid oxidation of sulphide compounds other than lead sulphide.

The residence time used in the selective oxidation step may vary widely. Suitable residence times may fall within the range of from less than 1 hour to 120 hours. The residence time may be dependent upon the type of feed material provided to the process and the pH at which the oxidation step is conducted. The residence time used in this step will be determined by the time required to achieve the desired level of oxidation of lead sulphide whilst also avoiding oxidation of other sulphide compounds. Thus, it will be realized that longer or shorter residence times than the ranges given above may be used.

Following the selective oxidation step, the oxidised lead compound is separated from the other metal sulphides.

In one embodiment, the pulp or slurry resulting from the selective oxidation step is sent to a flotation step or flotation process. In another embodiment, the pulp or slurry from the selective oxidation step may be passed through a liquid/solid separation step (such as filtration, sedimentation or settling), followed by optional washing and re-pulping.

In embodiments where the oxidised lead compound is separated from other metal sulphides by use of flotation, the flotation step may comprise any conventional flotation step or flotation process known to the person skilled in the art.

Lead is concentrated and recovered in the tailings from the flotation step. In some embodiments, it is desirable that 90% or greater of the other minerals present in the feed material report to the overflow/froth. This will result in the tailings being less diluted by other minerals and therefore having a higher lead content. Desirably, recovery of 95% or greater of other minerals to the overflow/froth is achieved, even more desirably 98% or greater.

In some embodiments, the tailings may contain lead levels of 40-75% by weight. Such tailings material may be suitable to be used as a feed material to a lead recovery process, such as lead smelting, without requiring further treatment. However, it will also be understood that the present invention encompasses situations where the lead containing tailings material is subjected to further upgrading to further increase the lead content prior to lead recovery and/or other forms of processing to extract value.

In embodiments where the other metal sulphides comprise zinc sulphide, the concentrate recovered from the flotation step (which comprises the overflow/froth stream) comprises a zinc containing concentrate. This concentrate may be treated to recover zinc therefrom. For example, the concentrate may include zinc sulphide and the concentrate may be treated using known pyrometallurgical processes (such as smelting), or hydrometallurgical processes (including leaching and electrowinning) to recover zinc.

A number of other separation techniques may also be used to separate the oxidised lead compound from the other metal sulphides or oxidised metal compounds. These other techniques may include gravity separation techniques, selective leaching of Pb from the oxidised product and from other metal sulphides or oxidised metal compounds and other techniques which will be known to an expert in the field.

DETAILED DESCRIPTION OF THE INVENTION

Figure 1:
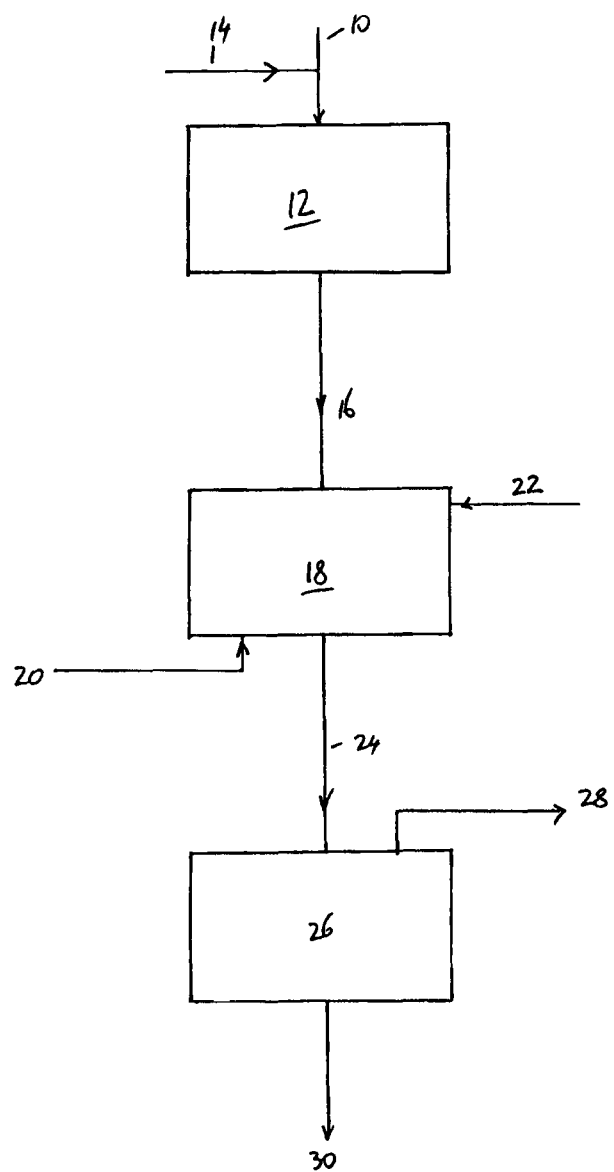
FIG. 1 shows a flow sheet of one embodiment of the present invention.

It will be understood that the drawings have been provided for the purposes of describing preferred embodiments of the present invention. Therefore, the skilled person will appreciate that the present invention should not be considered to be limited solely to the features as shown in the accompanying and drawings.

The first stage of the process shown in the embodiments described with reference to the attached drawings of the present invention involves grinding of the feed material. This grinding stage results in a dramatic increase in the mineral surface area. In some embodiments of the present invention, the first stage of the process involves ultrafine grinding, for example so that the $d_{80}$ of the ground material is less than 10 μm, more preferably less than 7 μm and possibly even less than 5 μm.

The grinding step is conducted in any grinding apparatus known to be suitable to a person skilled in the art. One especially suitable grinding mill that can be used in the grinding step is the IsaMill™, available from Xstrata Technology.

Reactants could be introduced to any chemical reactor, including directly to the grinding step, which provides a high degree of direct contact between reactants.

The ground slurry or pulp exiting the grinding stage is then provided to the oxidation stage. In a preferred embodiment of the present invention, the oxidation stage is carried out in open stirred tanks. The ground slurry or pulp is fed to the tanks. Air and sulphuric acid are also fed to the tanks and mixed with the ground slurry or pulp in the tanks. Air may be injected via spargers or aerators located in the bottom of the tanks. Impellers, stirrers or paddles may be used to stir the material in the tank.

As mentioned above, the amount of sulphuric acid required to be added in this embodiment of the oxidation stage will depend upon the amount of lead sulphide present in the mineral material and the amount of other acid consuming species present in the mineral material. The present inventors believe that an amount of sulphuric acid equivalent to 60% to 300% of the sulphuric acid required to convert the lead sulphides to lead sulphate is likely to be added to the oxidation step The pH in the oxidation step may be controlled so that it falls in the range of 0 to 4. One possible control strategy for controlling the oxidation step is to monitor the pH in the oxidation step and to conclude that the conversion of lead sulphides to oxidised lead compound(s) is essentially complete when the pH reaches about 4. If the process is conducted as a batch process, the acid may be added in a number of different steps or the acid may be added in a single step. In other embodiments, the process may be operated as a continuous process.

Another possible control strategy for controlling the oxidation step will be to monitor the level of oxidation of galena/lead sulphides in the oxidation step and standard ORP (oxidation reduction potential). For example, it might be desirable to target from 75 to 100% oxidation of galena, more preferably from 75 to 90% or 75 to 80% oxidation of galena, to lead sulphate or other oxidised lead compound. This will minimise the amount of lead that reports to the concentrate stream in the flotation step that follows the oxidation step and minimise the amount of other metal sulphides, such as zinc sulphide and iron sulphide, that report to the tailings in the flotation step.

The oxidation step is preferably operated by also injecting and mixing air into the pulp or slurry of mineral material. The amount of air that may be injected will typically be in excess of the amount of air required to effect the oxidation of galena (based upon stoichiometric requirements). Without wishing to be bound by theory, the present inventors believe that air may be desirable for use in the oxidation step of the present invention rather than pure oxygen because using air may result in less efficient oxidation when compared to using pure oxygen, and this could retard oxidation of other sulphide species in the mineral material. For the same reason, it may also be desirable to use a relatively high solids ratio of from about 50% to 65% by weight in the pulp or slurry present in the oxidation step. However, the present invention also encompasses other solids ratios, including a more typical solids ratio of 20 to 25% by weight of solids, in the oxidation step.

The oxidation step may be operated without applying any external heating. In this regard, the oxidation step may operate autothermally, with the only energy input into the oxidation step arising from the stirring of the pulp or slurry. Under these conditions, the actual temperature in the oxidation step in will depend upon the ambient temperature, the amount of acid added, the amount of air added and the solids ratio of the pulp or slurry. The present inventors have conducted test work that indicates that the oxidation process can be operated at temperature is anywhere from 20° C. up to 55° C. or more. In regions where the prevailing climate is a high temperature climate, it may even be necessary to cool the pulp or slurry in the oxidation step in order to minimise the oxidation of sulphide materials other than lead sulphide.

Although it is preferred that sulphuric acid is added to the oxidation step, it is possible that the oxidation step could be operated simply by mixing oxygen or oxygen containing gas into the pulp or slurry. Similarly, other oxidising agents, such as ferric ions, could also be used in the oxidation step.

The residence time used in the oxidation step can vary widely, with residence times of between 1 hour and 120 hours possibly being suitable. The residence time will largely depend upon the pH, the acid addition rate, the solids ratio, the amount of air injected into the pulp or slurry in the degree of oxidation of lead sulphides that is desirable.

After the mineral material has been oxidised to the extent required to have caused selective oxidation of a desired amount of the lead sulphides (which is suitably a substantial proportion of the lead sulphides present in the mineral material), the slurry or pulp of mineral material is removed from the oxidation step. The treated mineral material is then subjected to a separation step, such as a flotation step. The pulp or slurry removed from the oxidation step may simply be passed to a flotation circuit. Alternatively, the pulp or slurry removed from the oxidation step may be subjected to a solid/liquid separation (such as filtration). The recovered liquid may be recycled to the oxidation step. The solids material may be washed and re-pulped and the pulp sent to the flotation circuit.

Conventional flotation circuits may be used in the present invention. The person skilled in the art will readily understand how conventional flotation circuits operate and therefore further description need not be provided. Any known collectors may be used in the flotation circuit.

The flotation step results in the production of a tailings that contains oxidised lead compounds and a concentrate that contains zinc sulphide and other sulphides. As a result, the bulk of the lead containing material reports to the tailings. The tailings can then be treated to recover lead therefrom. For example, the tailings may be provided as a feed material to a lead smelter or a lead blast furnace. The tailings may be further upgraded using conventional or known technology to further enhance the lead content of the tailings prior to sending the tailings to led recovery process.

Experimental work conducted by the present inventors has shown that the lead content in the tailings can range from 20 to 75% by weight of Pb. An operating aim of the present process could be to target 90% plus recovery of other minerals to the overflow stream of the flotation step. Desirably, at least 95%, or even 98% of the other (non-lead) sulphide minerals will report to the overflow stream/concentrate.

The concentrate recovered from the flotation step (which represents an overflow stream or a froth stream) contains zinc sulphide and other sulphide materials. This concentrate may be sent for further processing.

FIG. 1 shows a flow sheet of the basic process in accordance with one embodiment of the present invention. In FIG. 1, a mixed sulphide feed material 10 is provided to a grinding mill 12. The mixed sulphide feed material comprises at least lead sulphide (e.g. galena) and zinc sulphide (e.g. sphalerite). Such mixed sulphides also typically contain other sulphide materials, such as iron sulphide (pyrite) and copper sulphide (chalcopyrite). An example of such a mixed sulphide material is the mineral recovered from the McArthur River mine in the Northern Territory, Australia, and also the mineral recovered from the Mount Isa mine in Queensland, Australia. The feed material 10 may comprise an ore. However, it is normal practice to upgrade as-mined ores to concentrates (for example, by subjecting the as-mined ore to a flotation process to separate excess gangue from the minerals) and a preferred feed material 10 comprises a mineral concentrate.

The feed material is subjected to an ultrafine grinding step in the grinding mill 12. Water 14 is typically mixed with the feed material 10 so that a slurry or pulp is present in the grinding mill 12.

Once the material has been ground to the desired extent, the pulp or slurry exits the mill at 16 and is passed to the oxidation step 18. The oxidation step 18 is suitably carried out in open stirred tanks. Air 20 and sulphuric acid 22 are added to the slurry 16 in the oxidation step. In the oxidation step, lead sulphide is oxidised. In one embodiment, the lead sulphide is oxidised to lead sulphate. However, the lead sulphide may be oxidised to form any lead compound that is more oxidised than lead sulphide, including lead sulphate and/or lead oxide.

Once the lead sulphide present in the material has been oxidised to the desired extent, the oxidised pulp 24 is removed from the oxidation step and passed to a flotation step 26. The flotation step 26 may comprise a conventional flotation circuit as is known to person skilled in the art. The flotation step 26 may comprise a single flotation step or it may comprise a multi-step flotation circuit.

In the flotation step 26, the unreacted sulphide materials, including zinc sulphide and iron sulphide, collect on the bubbles and leave the flotation step through an overflow stream or concentrate 28. Lead sulphate reports to the tailings 30 and is removed from the flotation circuit with the tailings.

The tailings 30 may then be treated to recover lead therefrom. The concentrate 28 may be treated to recover other sulphides. Conventional lead recovery and zinc recovery processes may be used.

Figure 2:
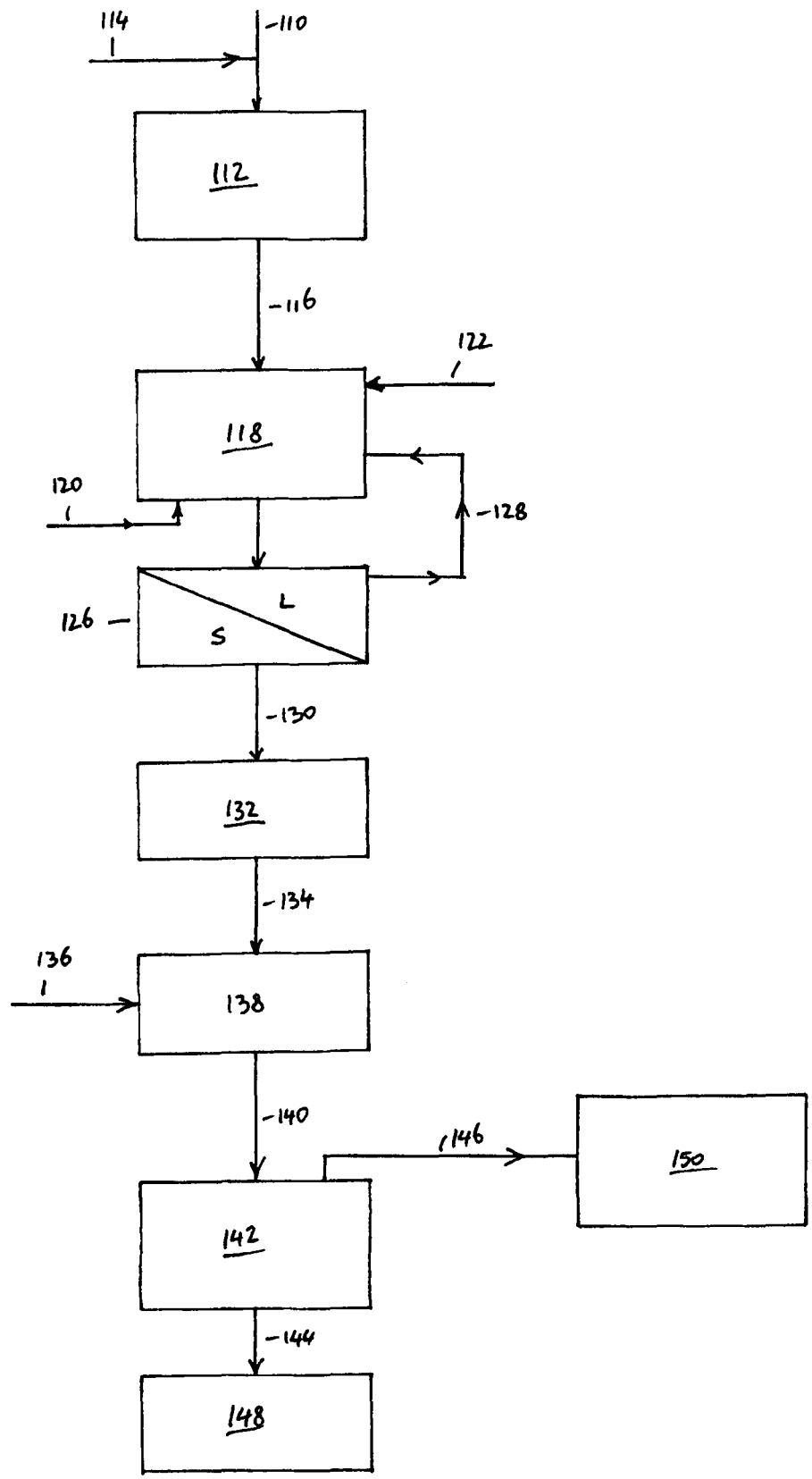
FIG. 2 shows a flow sheet of another embodiment of the present invention.

FIG. 2 shows a flow sheet of a more detailed variant of the process shown in FIG. 1. In FIG. 2, a feed material 110 is provided to a grinding mill 112. Water 114 is mixed with the feed material to form a pulp or slurry in the grinding the 112. The ground material 116 is removed from the mill and fed to the oxidation step 118. Air 120 is injected into the oxidation step. Sulphuric acid 122 is also added to the oxidation step 118.

The oxidised slurry or pulp 124 that leaves the oxidation step is passed to a liquid/solid separation step 126. Liquid/solid separation step 126 may suitably be a filtration step. The separated liquid 128, which contains an appreciable acid content, may be recycled to the oxidation step 118.

The separate solids 130 are subjected to a wash 132, suitably with water. The washed solids 134 are then mixed with further water 136 in re-pulping step 138. The re-pulped solids 140 are then transferred to flotation step 142. The lead sulphate reports to the tailings 144 and zinc sulphide and other sulphides report to the overflow stream/concentrate 146. The tailings 144 are transferred to a lead recovery process 148. The zinc containing concentrate 146 is transferred to a zinc recovery process 150.

Although the embodiments of the present invention shown in FIGS. 1 and 2 utilise a flotation step to separate the oxidised lead compound from the at least one other metal sulphide, it will be appreciated that a number of other separation techniques may be used to separate the oxidised lead compound from the at least one other metal sulphide. These other techniques may include gravity separation techniques, selective leaching of Pb from the oxidised product and from other metal sulphides or oxidised metal compounds and other techniques which will be known to an expert in the field

EXAMPLES

Tests 1 to 5

The tests were carried out with a concentrate having the composition set out in Table 1 being used as, a feed material:

TABLE 1

| Component | Wt % (average) |
| --- | --- |
| Pb | 8.5 |
| Zn | 45.4 |
| Fe | 6.7 |
| Si | 4.9 |
| Cu | 0.9 |
| S | 28.2 |
| Mg | 0.2 |
| Ca | 0.05 |
| Al | 0.54 |

The concentrate also contained Cl, F, As, Sb, Tl, Ge, Ag, As, Co, F, Mn and Ni in amounts of parts per million. The concentrate had a $d_{80}$ particle size of around 7 microns.

The objective of the test work carried out in these examples was to verify the response obtained in bench scale testing of bulk concentrate to a selective Lead Oxidation Process followed by a flotation stage to generate both a Zn Concentrate (<4% lead levels) and a Pb concentrate (+50% Pb levels) at a larger Pilot scale level (600 litres).

The conditions in each test varied, however the oxidant was provided by way of air injection at 130 lpm to all tests and the acid' addition target remained constant for all tests undertaken based around the stoichiometric requirement for the oxidation of galena to anglesite by way of;

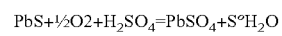

$$PbS + \tfrac{1}{2}O_2 + H_2SO_4 = PbSO_4 + S°H_2O$$

The first 3 tests conducted reviewed the effect of the staged addition of acid at a controlled rate to maintain the solution pH between 2-4 pH over an extended leach time.

Test 1 was conducted at ambient conditions which were approximately 18° C. and rising to 30° C. at 50% solids.

Test 2 was conducted at 55° C. target and at 50% solids.

Test 3 was conducted at 55° C. target and at 25% solids.

The residence times required to generate sufficient oxidation of galena to lead sulphate varied between 70-140 hrs via this methodology.

Tests 4 and 5 were conducted with a single dose of acid into the pulp.

A pulp density of 50% was used for both tests 4 and 5 and air was used as the oxidant.

Test 4 was conducted at a 55° C. target temperature.

Test 5 was conducted at ambient conditions which started at approximately 20° C. and rose to 32° C.

Results and Discussion:

The results and discussion will focus primarily on Tests 2,4 & 5.

1. In relative terms the addition of a single acid dose to the bulk concentrate resulted in a significant reduction in the time required to reach 70% oxidation of the galena to lead sulphate based on the measurements by way of the ammonium acetate method.
   a. Test 2=24 hrs
   b. Test 4=8 hrs
   c. Test 5=18 hrs
2. The absolute level of Pb oxidation achieved in the test work indicates ;
   a. Test 2=70%
   b. Test 4=80% 24 hrs
   c. Test 5=80% 22 hrs
3. The best flotation performance based on the combination of Pb grade in the concentrate and achieving maximum Pb recovery at target Pb grade in the tail indicates;
   a. Test 2=26 hrs
   b. Test 4=8 hrs
   c. Test 5=24 hrs All 5 tests conducted in the Pilot Plant can be considered successful with respect to achieving Zn and Pb concentrate grade targets.

The results obtained in the tests are summarised in Table 2:

The test results have shown that increased acid additions has generated faster kinetics. However the set of operating conditions which have given the best results (ie: high pulp density and air not oxygen), are not normally conducive to good leaching kinetics because they limit mass transfer between reactants. Interestingly the combination has enhanced the selectivity of the oxidation reactions favouring the most amenable toward oxidation, in this case galena and limiting the rate of oxidation of the other sulphide species. This has resulted in very high recovery of the remaining sulphides , $ZnS$, $FeS_2$, $AgS$, $CuFeS_2$ and a very selective flotation stage against lead sulphate resulting in high Pb grades in the tailings.

Conclusions and Recommendations

1. The primary and secondary objectives were achieved in the pilot plant, namely:
   a. Zn Concentrate at less than 4% Pb grade was obtained.
   b. Pb Concentrate (tailings) at over 50% Pb grade was obtained.
2. Moderate temperatures between 30-55° C. can be utilized for the process.
3. Effective Oxidation residence times are expected to be between 8-36 hours and may reduce with the use of larger size vessels, higher density pulp conditions and scale up due to reduced heat loss from the system.

TABLE 2

| Test Number | Feed Grade | | | Zn Concentrate Grade | | | Pb Tail Grade | | | Pb Tail Recovery | | | Zn Concentrate Recovery | | |
|---|---|---|---|---|---|---|---|---|---|---|---|---|---|---|---|
| | Pb % | Zn % | Fe % | Pb % | Zn % | Fe % | Pb % | Zn % | Fe % | Pb % | Zn % | Fe % | Pb % | Zn % | Fe % |
| Test 1 | 8.2 | 46.7 | 6.9 | 8.3 | 47.6 | 7.0 | 2.8 | 0.5 | 0.5 | 1 | 0 | 0.1 | 99 | 98 | 98 |
| Test 1 | 8.5 | 46.4 | 6.7 | 6.9 | 48.3 | 6.9 | 44.9 | 2.3 | 1.7 | 22 | 0.2 | 1.1 | 78 | 98 | 99 |
| Test 1 | 8.5 | 45.0 | 6.6 | 5.5 | 48.1 | 6.9 | 48.3 | 3.1 | 2.0 | 39 | 0.5 | 2.1 | 61 | 98 | 98 |
| Test 1 | 8.7 | 44.9 | 6.6 | 5.0 | 48.6 | 7.1 | 52.4 | 1.8 | 1.6 | 48 | 0.3 | 1.9 | 52 | 100 | 98 |
| Test 1 | 8.5 | 45.6 | 6.8 | 5.1 | 49.2 | 7.3 | 50.7 | 1.3 | 1.2 | 44 | 0.2 | 1.3 | 56 | 100 | 99 |
| Test 1 | 8.6 | 44.4 | 6.6 | 4.6 | 48.5 | 7.1 | 49.7 | 1.9 | 1.7 | 51 | 0.4 | 2.3 | 49 | 100 | 98 |
| Test 1 | 8.5 | 45.1 | 6.7 | 4.5 | 49.4 | 7.2 | 48.3 | 1.8 | 1.4 | 52 | 0.4 | 1.9 | 48 | 100 | 98 |
| Test 2 | 8.9 | 47.2 | 6.8 | 4.5 | 48.1 | 7.2 | 54.9 | 3.6 | 1.3 | 53 | 0.7 | 1.7 | 47 | 99 | 98 |
| Test 2 | 9.0 | 46.0 | 6.8 | 3.2 | 48.4 | 7.4 | 56.5 | 3.6 | 1.3 | 69 | 0.9 | 2.1 | 31 | 99 | 98 |
| Test 2 | 8.7 | 44.4 | 6.6 | 3.0 | 47.8 | 7.3 | 54.8 | 3.5 | 1.5 | 71 | 1.0 | 2.6 | 29 | 99 | 97 |
| Test 2 | 8.6 | 42.4 | 6.5 | 2.9 | 47.7 | 7.2 | 50.1 | 3.5 | 1.5 | 70 | 1.0 | 2.8 | 30 | 99 | 97 |
| Test 2 | 9.0 | 42.4 | 6.6 | 3.4 | 48.1 | 7.2 | 47.4 | 3.5 | 2.5 | 67 | 1.1 | 4.8 | 33 | 99 | 95 |
| Test 3 | 7.9 | 44.3 | 6.4 | 3.8 | 47.9 | 6.8 | 54.8 | 2.7 | 1.7 | 55 | 0.5 | 2.1 | 45 | 98 | 98 |
| Test 3 | 7.9 | 44.1 | 6.5 | 3.2 | 48.4 | 7.0 | 52.5 | 2.9 | 1.7 | 64 | 0.6 | 2.6 | 36 | 99 | 97 |
| Test 3 | 8.3 | 43.8 | 6.6 | 2.8 | 48.9 | 7.1 | 52.7 | 2.7 | 2.2 | 70 | 0.7 | 3.7 | 30 | 99 | 96 |
| Test 4 | 9.2 | 48.2 | 7.0 | 7.7 | 47.2 | 6.8 | 43.3 | 5.2 | 2.2 | 14 | 0.3 | 1.0 | 86 | 98 | 99 |
| Test 4 | 9.0 | 46.5 | 6.8 | 7.3 | 46.2 | 6.7 | 41.9 | 5.6 | 2.2 | 17 | 0.4 | 1.2 | 83 | 98 | 99 |
| Test 4 | 9.1 | 47.9 | 6.7 | 6.9 | 47.4 | 6.8 | 42.6 | 6.5 | 2.3 | 24 | 0.7 | 1.7 | 76 | 99 | 98 |
| Test 4 | 8.7 | 45.2 | 6.4 | 5.7 | 47.9 | 6.8 | 52.7 | 3.4 | 1.1 | 38 | 0.5 | 1.1 | 62 | 98 | 99 |
| Test 4 | 8.5 | 44.3 | 6.2 | 4.9 | 47.7 | 6.8 | 56.3 | 2.0 | 0.6 | 46 | 0.3 | 0.6 | 54 | 98 | 99 |
| Test 4 | 8.5 | 44.4 | 6.3 | 3.2 | 48.4 | 7.0 | 57.9 | 1.1 | 0.3 | 64 | 0.2 | 0.4 | 36 | 98 | 99 |
| Test 4 | 8.5 | 43.6 | 6.3 | 2.2 | 48.4 | 7.0 | 56.1 | 2.3 | 0.5 | 76 | 0.6 | 0.9 | 24 | 98 | 99 |
| Test 4 | 8.6 | 43.5 | 6.3 | 2.9 | 48.5 | 7.1 | 55.5 | 2.9 | 0.7 | 70 | 0.7 | 1.2 | 30 | 98 | 99 |
| Test 4 | 8.7 | 44.3 | 6.4 | 2.6 | 48.6 | 7.5 | 53.8 | 4.5 | 1.3 | 74 | 1.3 | 2.3 | 26 | 98 | 98 |
| Test 4 | 8.7 | 43.6 | 6.4 | 2.5 | 48.6 | 6.8 | 55.8 | 1.5 | 0.8 | 72 | 0.4 | 1.4 | 28 | 98 | 99 |
| Test 4 | 8.6 | 42.7 | 6.2 | 3.3 | 49.2 | 7.2 | 60.5 | 1.1 | 0.5 | 66 | 0.2 | 0.7 | 34 | 98 | 99 |
| Test 4 | 8.4 | 42.7 | 6.3 | 3.1 | 50.0 | 7.4 | 57.4 | 1.1 | 0.6 | 68 | 0.3 | 0.9 | 32 | 98 | 99 |
| Test 4 | 8.7 | 44.1 | 6.7 | 2.9 | 50.5 | 7.5 | 56.1 | 1.0 | 0.9 | 71 | 0.2 | 1.5 | 29 | 98 | 98 |
| Test 5 | 8.5 | 48.7 | 7.1 | 7.3 | 48.1 | 6.9 | 41.9 | 2.5 | 1.2 | 11 | 0.1 | 0.4 | 89 | 98 | 98 |
| Test 5 | 8.6 | 48.8 | 7.1 | 6.2 | 49.3 | 7.0 | 52.6 | 1.4 | 0.7 | 27 | 0.1 | 0.4 | 73 | 98 | 99 |
| Test 5 | 8.5 | 48.4 | 7.0 | 5.0 | 47.6 | 6.9 | 57.6 | 1.5 | 0.7 | 40 | 0.2 | 0.6 | 60 | 98 | 99 |
| Test 5 | 8.5 | 48.5 | 6.9 | 4.2 | 49.6 | 7.1 | 62.6 | 1.1 | 0.5 | 51 | 0.2 | 0.5 | 49 | 98 | 98 |
| Test 5 | 8.5 | 48.3 | 6.9 | 4.1 | 50.1 | 7.2 | 65.8 | 1.2 | 0.6 | 54 | 0.2 | 0.6 | 46 | 98 | 99 |
| Test 5 | 7.9 | 45.4 | 6.5 | 3.1 | 51.3 | 7.4 | 61.3 | 1.9 | 0.9 | 64 | 0.3 | 1.1 | 36 | 98 | 99 |
| Test 5 | 6.2 | 43.8 | 7.7 | 3.0 | 49.8 | 7.3 | 58.5 | 1.3 | 0.7 | 65 | 0.3 | 0.9 | 35 | 98 | 99 |
| Test 5 | 8.2 | 45.4 | 6.6 | 2.9 | 49.3 | 7.0 | 59.7 | 1.4 | 0.7 | 67 | 0.3 | 1.0 | 33 | 98 | 99 |
| Test 5 | 7.9 | 43.1 | 6.4 | 2.8 | 49.5 | 7.2 | 56.5 | 1.1 | 0.5 | 67 | 0.2 | 0.7 | 33 | 98 | 99 |
| Test 5 | 7.6 | 42.2 | 6.2 | 2.8 | 50.3 | 7.3 | 54.3 | 1.3 | 0.7 | 67 | 0.3 | 1.0 | 33 | 98 | 99 |

4. Air can be utilized successfully as the oxidant. Although oxygen can be utilized there does not appear to be a clear advantage in utilizing oxygen.

5. Pulp densities over 50% will be acceptable for the operation and successful operation above 50% solids is likely.

Flotation response is robust and is not significantly affected by p1-1, solution chemistry, flocculant and is likely to not require copper sulphate activation.

Those skilled in the art will appreciate that the present invention may be susceptible to variations and modifications other than those specifically described. It will be understood that the present invention encompasses all such variations and modifications that fall within its spirit and scope.

What is claimed is:

1. A process for treating a mixed sulphidic material containing lead sulphide and at least one other metal sulphide, the process comprising the steps of subjecting the mixed sulphidic material to selective oxidation such that lead sulphide in the material is oxidised to form an oxidised lead compound whilst complete oxidation of the at least one other metal sulphide is avoided, and separating the oxidized lead compound from the at least one other metal sulphide using a flotation process.

2. A process as claimed in claim 1 wherein the oxidised lead compound is separated from the at least one other metal sulphide by use of a flotation step wherein the oxidised lead compound reports to a tailings stream and the at least one other metal sulphide is recovered to a concentrate.

3. A process as claimed in claim 1 wherein the mixed sulphidic material that forms a feed material comprises a sulphide ore or a sulphide concentrate.

4. A process as claimed in claim 3 wherein the mixed sulphidic material contains lead sulphide, and the at least one additional sulphide is zinc sulphide or iron sulphide.

5. A process as claimed in claim 1 wherein the mixed sulphidic material is subject to grinding prior to the selective oxidation step.

6. A process as claimed in claim 5 wherein the mixed sulphidic material is subjected to an ultrafine grinding process such that the ground material has a $d_{80}$ of less than 20 μm, less than 15 μm, less than 10 μm, or less than 7 μm.

7. A process as claimed in claim 1 wherein at least 50 to 100% of the lead sulphide present in the material is oxidised.

8. A process as claimed in claim 1 wherein oxidation of the lead sulphide is achieved by passing an oxygen containing gas through a slurry or pulp of the mixed sulphidic material.

9. A process as claimed in claim 8 wherein air is added to the pulp or slurry of the mixed sulphidic material in order to selectively oxidise the lead sulphide.

10. A process as claimed in claim 8 wherein an excess of the oxygen containing gas is added, calculated on the amount of oxygen required to oxidise lead sulphide.

11. A process as claimed in claim 8 wherein selective oxidation of the lead sulphide is achieved by mixing the pulp or slurry with air or other oxygen containing gas, or selective oxidation of the lead sulphide is achieved by mixing the pulp or slurry with air or other oxygen containing gas and also enhanced by the combination with other oxidants which may include ferric ions.

12. A process as claimed in claim 8 wherein selective oxidation of the lead sulphide is carried out under acidic conditions.

13. A process as claimed in claim 12 wherein the pH in the selective oxidation step is controlled to fall within the range of from 0 to 4.

14. A process as claimed in claim 12 wherein sulphuric acid is used in the selective oxidation step to assist in forming lead sulphate during the oxidation process.

15. A process as claimed in claim 14 wherein an amount of sulphuric acid equivalent to 60% to 300% of the molar amount of the sulphuric acid required to convert the lead sulphides to lead sulphate is added to the selective oxidation step.

16. A process as claimed in claim 1 wherein the selective oxidation step is conducted by mixing air with a pulp or slurry in a mixing tank and the pulp or slurry in the mixing tank has a solids content of 5 to 80% by weight, 20 to 25% by weight, or 50 to 65% by weight.

17. A process as claimed in claim 1 wherein the residence time used in the selective oxidation step falls within the range of from less than 1 hour to 120 hours.

18. A process as claimed in claim 2 which further comprises forming a pulp or slurry by the selective oxidation step and sending the pulp or slurry to the flotation process to separate the oxidised lead compound from the other metal sulphides.

19. A process as claimed in claim 18 wherein lead is concentrated and recovered in the tailings from the flotation process and 90% or greater of other minerals present in the feed material report to an overflow/froth.

20. A process as claimed in claim 18 wherein the tailings contain lead levels of 20-75% by weight.

21. A process as claimed in claim 18 wherein the at least one other metal sulphide comprises zinc sulphide, the concentrate recovered from the flotation process comprises a zinc containing concentrate which is subsequently treated to recover zinc therefrom.

22. A process as claimed in claim 1 wherein the oxidised lead compound is separated from the at least one other metal sulphide during the flotation process using gravity separation techniques, or by selective leaching of Pb.

* * * * *